United States Patent
Nugent

(10) Patent No.: US 9,334,201 B2
(45) Date of Patent: *May 10, 2016

(54) ORGANIC COMPOSITION FOR USE WITH PLANTS

(71) Applicant: The Dirt Merchant, Inc., Newtown, PA (US)

(72) Inventor: Michael R. Nugent, Bensalem, PA (US)

(73) Assignee: The Dirt Merchant, Inc., Bensalem, PA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/739,422

(22) Filed: Jun. 15, 2015

(65) Prior Publication Data

US 2015/0284300 A1 Oct. 8, 2015

Related U.S. Application Data

(63) Continuation-in-part of application No. 14/364,835, filed as application No. PCT/US2013/057876 on Sep. 3, 2013, now Pat. No. 9,085,496.

(51) Int. Cl.
| | |
|---|---|
| *C05F 11/08* | (2006.01) |
| *C05F 5/00* | (2006.01) |
| *C05G 3/04* | (2006.01) |
| *C05G 3/02* | (2006.01) |
| *C05F 3/00* | (2006.01) |
| *C05F 11/00* | (2006.01) |

(52) U.S. Cl.
CPC ... *C05G 3/02* (2013.01); *C05F 3/00* (2013.01); *C05F 5/00* (2013.01); *C05F 11/00* (2013.01); *C05G 3/04* (2013.01); *C05F 11/08* (2013.01); *Y02P 20/145* (2015.11)

(58) Field of Classification Search
CPC .............. C05G 3/04; C05G 3/02; C05F 5/00; C05F 11/08
See application file for complete search history.

(56) References Cited

U.S. PATENT DOCUMENTS

| | | | | |
|---|---|---|---|---|
| 5,900,038 | A * | 5/1999 | Wilhelm | C05F 11/00 71/23 |
| 9,085,496 | B2 * | 7/2015 | Nugent | C05F 11/08 |
| 2008/0280760 | A1 * | 11/2008 | Oliver | C05F 11/00 504/101 |
| 2012/0144888 | A1 * | 6/2012 | Zhang | C05G 3/00 71/23 |

* cited by examiner

*Primary Examiner* — Wayne Langel
(74) *Attorney, Agent, or Firm* — Michael G. Crilly, Esq.

(57) ABSTRACT

An organic composition for use with plants is presented. The organic composition is a mixture of filtration waste with or without sand and further includes optional constituents such soil(s) and/or compostable material(s) and/or non-compostable material(s). The filtration waste further includes carbon, diatomaceous earth, and sugar. In some embodiments, the filtration waste is a byproduct from the refinement of sugar. In other embodiments, the filtration waste may be prepared by combining sugar, diatomaceous earth, and carbon. In yet other embodiments, the organic composition is prepared by removing the filtration waste from filtering equipment after the refinement of sugar and mixing the filtration waste with soil(s), compostable material(s), and/or non-compostable material(s). The organic composition is suitable for use as a growth medium for plants, a soil amendment, a soil additive, or a soil supplement.

44 Claims, No Drawings

ORGANIC COMPOSITION FOR USE WITH PLANTS

CROSS REFERENCE TO RELATED APPLICATIONS

This application is a continuation-in-part application of U.S. patent Application Ser. No. 14/364,835 filed Jun. 12, 2014 entitled *Organic Composition for Use with Plants* which is based upon and claims priority from Patent Cooperation Treaty Application No. PCT/US2013/057876 filed Sep. 3, 2013 entitled *Organic Composition for Use with Plants*. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a composition compatible with plant life and suitable as a medium, amendment, additive, or supplement. Specifically, the invention is an organic composition including a filtration waste and sand with optional soil(s) and/or compostable material(s) and/or non-compostable material(s) whereby filtration waste is a mixture of carbon, diatomaceous earth, and sugar.

2. Background

Sugar refining is the process whereby high-quality sugars are produced from sugarcane. After sugarcane is harvested, the stalks are crushed to extract juices which are eventually processed into a variety of edible sugars. Bagasse is a fibrous matter that remains after the crushing process. Bagasse is often burned to produce steam that powers the refinery which processes the juices. Bagasse is also used as a composition for conditioning the soil environment around plants to improve the rate and uniformity of plant growth. However, bagasse has a relatively high carbon-to-nitrogen ratio which tends to inhibit plant growth. Therefore, bagasse requires further processing, conditioning, and/or additives to avoid this and other problems associated with its use as a soil supplement.

Sugarcane juices are dried and processed to form a raw sugar, often in the form of a course crystal. The raw sugar is shipped to refineries for processing into a final product, examples including but not limited to granulated sugars, soft brown sugars, and sugar cubes. The raw sugar is affined, melted, clarified, decolorized, and crystallized. Sugar products are dried and packaged for sale.

Affination is the mixing of raw sugar with a warm syrup which removes the molasses coating from the sugar crystals. The syrup and crystals are separated by spinning within a centrifuge, and the crystals are further washed with a water spray. The sugar crystals are then fed into a melter, wherein the crystals are dissolved within hot water to form a liquor. The raw liquor is often clarified via a process which includes either phosphatation or carbonatation.

Phosphatation includes addition of phosphoric acid and lime to the liquor resulting in the formation of calcium phosphate. The liquor is placed in a floatation clarifier which allows the calcium phosphate byproduct to float to the top of the liquor for eventual removal by surface scraping.

Carbonatation includes addition of carbon dioxide gas and lime to the liquor resulting in the formation of calcium carbonate. The liquor is placed in a flotation clarifier which allows the calcium carbonate byproduct to float to the top of the liquor for eventual removal by surface scraping.

It may be possible for the calcium phosphate or the calcium carbonate to be filtered from the liquor in addition to or instead of scraping.

The liquor may be decolorized via the addition of carbon adsorbents, examples including but not limited to granular activated carbon and bone charcoal. The liquor is passed through pressure leaf filters which include layers of diatomaceous earth. The filters separate the carbon from the liquor by trapping the carbon within the filters and allowing the liquor to pass through the filters. A portion of the sugar coats or is trapped by the diatomaceous earth, filters, and/or carbon, the latter formed on the filters during filtration. The filters are cleaned to remove the filtration waste, namely, carbon, diatomaceous earth, and sugar.

In other refinement methods, the liquor with or without carbon, is passed through pressure leaf filters which include layers of diatomaceous earth and carbon. The filters separate the carbon, if present, from the liquor by trapping the carbon within the filters and allowing the liquor to pass through the filters. A portion of the sugar coats or is trapped by the diatomaceous earth, filters, and/or carbon. The filters are cleaned to remove the filtration waste, namely, carbon, diatomaceous earth, and sugar.

It is understood that the components of the filtration waste, namely, carbon, diatomaceous earth, and sugar are critical to the present invention. The refinement methodology resulting in the combination of components is not part of the present invention and does not limit the scope of the invention. Furthermore, the refinement methodologies are in no way limited to the examples provided herein.

Presently, the filtration waste has little or no reuse value and is discarded and often disposed of in a waste disposal site. In view of the deficiencies associated with bagasse as a soil conditioner, it would be highly advantageous if the filtration waste could be used within an organic composition to improve the growth characteristics otherwise achievable with various formulations of soils, compostable materials, and non-compostable materials.

Therefore, what is required is an organic composition including filtration waste that improves the growth characteristics otherwise achievable with various formulations of soils, compostable materials, and non-compostable materials.

SUMMARY OF THE INVENTION

An object of the present invention is to provide an organic composition including filtration waste that improves the growth characteristics otherwise achievable with various formulations of soils, compostable materials, and non-compostable materials.

In accordance with some embodiments of the invention, the organic composition includes topsoil in the range from 0.0% to 37.8% by weight, dirt in the range from 0.0% to 71.8% by weight, wood chips in the range from 2.2% to 19.5% by weight, leaves in the range from 0.0% to 2.4% by weight, manure in the range from 0.0% to 17.4% by weight, sand in the range from 0.1% to 10.9% by weight, and filtration waste in the range from 5.1% to 78.0% by weight. Weights are relative to the total weight of the organic composition.

In accordance with embodiments of the invention, the organic composition includes dirt in the range from 60.9% to 71.8% by weight, wood chips in the range from 2.2% to 4.4% by weight, leaves in the range from 0.0% to 2.2% by weight, manure in the range from 8.9% to 17.4% by weight, sand in the range from 8.6% to 10.2% by weight, and filtration waste in the range from 5.1% to 13.3% by weight. Weights are relative to the total weight of the organic composition.

In accordance with embodiments of the invention, the organic composition includes sand and filtration waste. The filtration waste further includes carbon, diatomaceous earth, and sugar.

In accordance with embodiments of the invention, the organic composition includes soil, sand, and filtration waste. The filtration waste further includes carbon, diatomaceous earth, and sugar.

In accordance with embodiments of the organic composition, the soil is topsoil.

In accordance with embodiments of the organic composition, the soil is dirt.

In accordance with embodiments of the invention, the organic composition includes a compostable material, sand, and filtration waste. The filtration waste further includes carbon, diatomaceous earth, and sugar.

In accordance with embodiments of the organic composition, the compostable material is wood chips.

In accordance with embodiments of the organic composition, the compostable material is leaves.

In accordance with embodiments of the organic composition, the compostable material is manure.

In accordance with embodiments of the organic composition, the compostable material is grass.

In accordance with embodiments of the organic composition, the compostable material is moss.

In accordance with embodiments of the organic composition, the compostable material is worm castings.

In accordance with embodiments of the organic composition, the compostable material is hay.

In accordance with embodiments of the organic composition, the compostable material is straw.

In accordance with embodiments of the organic composition, the compostable material is bark.

In accordance with embodiments of the organic composition, the compostable material is a cone.

In accordance with embodiments of the organic composition, the compostable material is a needle.

In accordance with embodiments of the organic composition, the compostable material is a nut.

In accordance with embodiments of the organic composition, the compostable material is a shell.

In accordance with embodiments of the organic composition, the compostable material is paper.

In accordance with embodiments of the organic composition, the compostable material is cardboard.

In accordance with embodiments of the invention, the method of producing an organic composition includes removing a filtration waste from filtering equipment after refinement of sugar and mixing the filtration waste and a non-compostable material. The filtration waste is a waste byproduct of sugar refinement and includes carbon, diatomaceous earth, and sugar.

In accordance with embodiments of the method, the non-compostable material is sand.

In accordance with embodiments of the method, the non-compostable material is crushed seashells.

In accordance with embodiments of the invention, the method of producing an organic composition includes removing a filtration waste from filtering equipment after refinement of sugar and mixing the filtration waste and soil. The filtration waste is a waste byproduct of sugar refinement and includes carbon, diatomaceous earth, and sugar.

In accordance with embodiments of the method, the soil is topsoil.

In accordance with embodiments of the method, the soil is dirt.

In accordance with embodiments of the invention, the method of producing an organic composition includes removing a filtration waste from filtering equipment after refinement of sugar and mixing the filtration waste and a compostable material. The filtration waste is a waste byproduct of sugar refinement and includes carbon, diatomaceous earth, and sugar.

In accordance with embodiments of the method, the compostable material is wood chips.

In accordance with embodiments of the method, the compostable material is leaves.

In accordance with embodiments of the method, the compostable material is manure.

In accordance with embodiments of the method, the compostable material is grass.

In accordance with embodiments of the method, the compostable material is moss.

In accordance with embodiments of the method, the compostable material is worm castings.

In accordance with embodiments of the method, the compostable material is hay.

In accordance with embodiments of the method, the compostable material is straw.

In accordance with embodiments of the method, the compostable material is bark.

In accordance with embodiments of the method, the compostable material is a cone.

In accordance with embodiments of the method, the compostable material is a needle.

In accordance with embodiments of the method, the compostable material is a nut.

In accordance with embodiments of the method, the compostable material is a shell.

In accordance with embodiments of the method, the compostable material is paper.

In accordance with embodiments of the method, the compostable material is cardboard.

Several advantages are offered by the invention. The invention facilitates reuse of materials otherwise discarded after the refinement of sugar. The invention is suitable for use as a growth medium, soil amendment, soil additive, or soil supplement. The invention is applicable as a ground cover within contamination sites and believed to remediate some contaminated soils. The sugar within the composition is believed to increase the number of organisms available to decompose the compostable constituents, thus decreasing the time required for decomposition. Some embodiments of the invention are believed to repel certain types of insects. Some embodiments of the invention are believed to resist certain fungi.

DETAILED DESCRIPTION OF THE INVENTION

Reference will now be made in detail to embodiments of the invention. Unless otherwise defined, all terms used in disclosing the invention, including technical and scientific terms, have the meaning as commonly understood by one of ordinary skill in the art to which this invention belongs. By means of further guidance, definitions are included to better appreciate the teaching of the present invention.

"Topsoil" refers to compositions composed of minerals and organic matter. Minerals many include silt, clay, and/or sand. Organic matter may be live and/or dead. Some compositions of topsoil may further include water and/or gases.

"Dirt" refers to compositions of topsoil with little or no organic matter. Fill dirt is one non-limiting example of dirt which generally refers to a subsoil often found below a topsoil.

"Wood chips" is the plural of wood chip which refers to small-to-medium size material, with or without bark, made by cutting, chipping, or otherwise removing smaller pieces of wood from larger pieces of wood. Exemplary, non-limiting forms of wood chips are mulch and wood pulp. Some compositions of wood chips may be at least partially decomposed, wet, and/or include organisms which decompose wood and other organic matter.

"Leaves" is the plural of leaf which refers to an outgrowth from a plant that is typically a flattened expanded variably shaped organ, constitutes a unit of the foliage, and functions primarily in food manufacture by photosynthesis when chlorophyll is present. Some forms of leaves may be at least partially decomposed, wet, and/or include organisms which decompose leaves and other organic matter.

"Manure" refers to animal or human dung. Exemplary, non-limiting sources of animal manure are domestic farm animals including cows, horses, sheep, pigs and chickens. Human manure is preferred to be processed or treated to eliminate infectious organisms.

"Sand" refers to granular material composed of finely divided rock and mineral particles. Exemplary, non-limiting constituents of sand are silica, usually in the form of quartz, and calcium carbonate, one non-limiting example being aragonite.

"Grass" refers to a plant that has narrow green leaves typically grown as a ground cover.

"Moss" refers to a type of green plant that has very small leaves and no flowers and that grows on rocks, bark, or wet ground.

"Worm castings" refer to the end product of the breakdown of organic matter by a worm.

"Hay" refers to grass that has been mowed and dried.

"Straw" refers to dried stalks of grain typically used as fodder or as material for thatching, packing, or weaving.

"Bark" refers to the external covering of the woody stems, branches, and roots of plants, as distinct and separable from the wood itself.

"Cone" refers to the conical-shaped seed bearing structure of pine, fir, larch, spruce, hemlock, and other cone-bearing trees.

"Needle" refers to a needle-shaped leaf typically grown on a tree or a shrub.

"Nut" refers to a dry seeded fruit with or without a woody wall.

"Shell" refers to the outer covering of a seed, fruit, or the like. Non-limiting examples including a peanut shell and an acorn shell.

"Paper" refers to a substance made from wood pulp, rags, straw, or other fibrous material.

"Cardboard" refers to a material made of pressed paper pulp or pasted sheets of paper.

"Compostable material" refers to matter capable of being decomposed and/or recycled as a fertilizer and/or soil amendment, additive or supplement.

"Non-compostable material" refers to matter incapable of being organically decomposed, however suitable for use with soil as a fertilizer, amendment, additive, or supplement. Non-limiting examples including sand and crushed seashells.

Terms may also be defined with additional language in the remaining portions hereof.

The invention includes organic compositions composed of filtration waste and sand, one or more soils, one or more compostable materials, and/or one or more non-compostable materials. Soils further include, but are limited to, topsoil and dirt. Compostable materials include, but are not limited to, wood chips, leaves, manure, grass, moss, worm castings, hay, straw, bark, cones, nuts, needles, shells, paper, and cardboard. Non-compostable materials include, but are not limited to, sand and crushed seashells.

The topsoil constituent provides a readily available source of organic materials and organisms. However, topsoil is generally expensive compared to other constituents within the organic composition. A mixture of a dirt constituent and a manure constituent may provide a lower-cost substitute for an organic composition including topsoil only, whereby the manure is a source of organic matter, organisms, nitrogen, and other nutrients beneficial to plant growth. The total weight of manure depends on the organic content and organism load desired within the dirt/manure mixture. For purpose of example only, a dirt-to-manure ratio of approximately 4.67 to 7 may provide an adequate substitute for topsoil, thereby increasing the total mass of topsoil within the composition while minimizing costs. However, other dirt-to-manure ratios are possible depending on the quality and characteristics of the dirt and manure and end use of the organic composition.

In some formulations, it may be possible to replicate the characteristics of the organic composition without the topsoil constituent. For example, the weight of the topsoil otherwise desired may be replaced with an equal quantity of dirt on a weight basis and the manure content increased in proportion to the dirt-to-manure ratio required to approximate topsoil. By way of example only, a formulation of 4 pounds topsoil, 8 pounds dirt, and 2 pounds manure would have a target dirt-to-manure ratio of 4. The substitute formulation without topsoil would therefore include 12 pounds dirt and one additional pound of manure for a total of 3 pounds manure to maintain the target dirt-to-manual ratio of 4.

The use of the compostable material(s) within the organic composition are optional depending on cost, availability, and end use of the composition. In preferred embodiments, formulations of the organic composition may have a total organic content in the range from 5% to 10% by weight relative to the total weight of the organic composition. However, the total organic content may be more or less depending on the plant life supported by the organic composition. Formulations may be applicable as the top layer or bedding for plants or as a covering or supplement, additive, or amendment for soil.

The wood chips, leaves, manure, grass, moss, worm castings, hay, straw, bark, cone, needle, nut, and shell constituents are readily compostable materials and good sources of organic matter, organisms, nitrogen, and other nutrients beneficial to plant growth. The wood chips, leaves, grass, moss, worm castings, hay, straw, bark, cones, needles, paper, and cardboard constituents may be used to increase the bulk or volume of the organic composition thereby allowing for aeration and oxygenation of the compositions.

The organic compositions may include a variety of formulations. The weight fraction of each compostable material depends in part on the quantity of nitrogen, organisms, and other nutrients required by the plant life supported by the organic composition. In some embodiments, it is possible for the wood chips to be replaced with an equal amount of leaves on a weight basis. In other embodiments, it is possible for the leaves to be replaced with an equal amount of wood chips on a weight basis. The substitution of wood chips for leaves or leaves for wood chips may also be on a non-weight basis whereby the substitution replicates a target value with respect to organic matter, organism load, nitrogen content, and/or other factor(s) beneficial to plant growth. Some formulations may not include leaves and the proportion of wood chips may or may not be adjusted depending on the nitrogen content of the organic composition.

The non-compostable constituents generally improve the drainage characteristics of the organic composition by providing a source of matter which resists or is incapable of absorbing water. The non-compostable materials may be useful in adjusting the pH level of the organic composition. Adjustability may depend on a variety of factors including, but not limited to, the type and composition of the non-compostable material, the form of the non-compostable material (for example, powder or granular form), the initial pH of the organic composition, and the constituents of the organic composition. The weight fraction of each non-compostable material depends in part on the absorption properties of the other constituents, the weather conditions where the organic composition will be used, and the plant life supported by the organic composition.

The filtration waste is primarily composed of carbon, diatomaceous earth, and sugar. The respective ratios of carbon, diatomaceous earth, and sugar within the filtration waste are dependent on the variety of factors including, but not limited to, the following: the refinement process; the type and performance characteristics of the filters within the refinement system; the quantity, type and particle size of the carbon additive; the quantity, type and particle size of the sugar and adherence properties thereof; the thickness of the diatomaceous earth and/or carbon layers used within the filtration system; and the frequency at which the filter elements are cleaned. The filtration waste is generally moist when removed from the filtration system and may dry and harden over time. The filtration waste may be moistened and/or crushed prior to addition with other constituents comprising the organic composition.

The filtration waste may include a variety of formulations. By way of example only, the filtration waste could include sugar, diatomaceous earth, and carbon whereby the ratio of diatomaceous earth to carbon is from 0.82 to 1.0 on a weight basis. In preferred embodiments, the filtration waste may have a total organic content as high as 85% by weight relative to the total weight of the filtration waste. However, the total organic content may be more or less depending on the final formulation of the organic composition and the plant life supported by the organic composition.

The carbon is added either in powder or particulate form to sugar during processing to decolorize the sugar in its final or nearly final form. In other refinement methods, the carbon could reside within the filter elements. The carbon within the waste is generally beneficial to plant growth. However, too much carbon could be detrimental as observed when bagasse is added to topsoil. In the present invention, the carbon may be balanced by the nitrogen originating from the topsoil, manure, wood chips, leaves, and/or other compostable materials.

The diatomaceous earth is composed of the fossilized remains of one-celled plants referred to as diatoms. The diatomaceous earth may be a powder or particulates. Food-grade diatomaceous earth is preferred to minimize toxins or chemicals otherwise detrimental to plant growth and use. In the present invention, it is believed that the diatomaceous earth may act as a pesticide against a wide variety of garden pests including, but not limited to, aphids, beetle grubs, ants and squash bugs.

The sugar may include raw sugar, processed sugar, sugar constituents, carbohydrates, or the like trapped by and/or adhered to the filters within a filtration system during refining. It is likewise possible for the sugar to be trapped by and/or adhered to the carbon and/or diatomaceous earth. In some embodiments, the total weight of sugar will be less than that of the carbon and diatomaceous earth as the sugar passes through the filtration system. In the present invention, it is believed that the sugar may provide a readily available food source for organisms originating in the topsoil, manure, wood chips, leaves and/or other compostable materials. It is also believed that the sugar, if consumed, enables the organisms to reproduce at a higher rate than normal, thereby promoting the growth of the organism colony which otherwise resides within the organic composition and is capable of decomposing the compostable constituents.

While the filtration waste is preferred to be a byproduct from the filtration step during refinement of sugar, other non-refinement sources are possible for the filtration waste. In one non-limiting example, the filtration waste may be prepared by combining and mixing sugar, diatomaceous earth, and carbon in the desired weight fractions. The constituents may be separately purchased in powder or particulate form, placed in an industrial mixer, and blended until the constituents are evenly distributed throughout the mixture. In some embodiments, a liquid, one non-limiting example being water, may be added to the mixture prior to combination with other constituents comprising the organic composition. In other embodiments, it may be advantageous to dry the mixture prior to combination with other constituents comprising the organic composition.

It is understood that the weight fractions of the constituents comprising the filtration waste is application dependent and therefore could include an infinite number of formulations. The respective ratios of carbon, diatomaceous earth, and sugar within the filtration waste are dependent on the variety of factors including, but not limited to, the plant life exposed of the organic composition, environmental conditions, other constituents comprising and formulation of the organic composition, and organism load within the formulation and soil onto which the organic composition is applied. In preferred embodiments, the filtration waste includes carbon in the range from 19% to 32.7% by weight, diatomaceous earth in the range from 17.3% to 30% by weight, and sugar in the range from 40% to 62% by weight. One specific non-limiting example is carbon at 26.6% by weight, diatomaceous earth at 21.8% by weight, and sugar at 51.6% by weight. Weights are relative to the total weight of the filtration waste.

A variety of formulations are possible for the organic composition. Exemplary formulations include: sand and filtration waste; sand, filtration waste, and soil; sand, filtration waste, and topsoil; sand, filtration waste, and dirt; sand, filtration waste, and compostable material; sand, filtration waste, and wood chips; sand, filtration waste, and leaves; sand, filtration waste, and manure; sand, filtration waste, and grass; sand, filtration waste, and moss; sand, filtration waste, and worm castings; sand, filtration waste, and hay; sand, filtration waste, and straw; sand, filtration waste, and bark; sand, filtration waste, and cones; sand, filtration waste, and needles; sand, filtration waste, and nuts; sand, filtration waste, and shells; sand, filtration waste, and paper; sand, filtration waste, and cardboard; filtration waste and non-compostable material; filtration waste and sand; filtration waste and crushed seashells; filtration waste and compostable materials; filtration waste and wood chips; filtration waste and leaves; filtration waste and manure; filtration waste and grass; filtration waste and moss; filtration waste and worm castings; filtration waste and hay; filtration waste and straw; filtration waste and bark; filtration waste and cones; filtration waste and needles; filtration waste and nuts; filtration waste and shells; filtration waste and paper; and filtration waste and cardboard.

The organic composition with topsoil and/or dirt may include other formulations whereby the constituents are present in the composition in the proportion of 0.0% to 37.8% topsoil, 0.0% to 71.8% dirt, 2.2% to 19.5% wood, 0.0% to 2.4% leaves, 0.0% to 17.4% manure, 0.1% to 10.9% sand, and 5.1% to 78.0% filtration waste. Weight fractions are relative to the total weight of the organic composition.

The organic composition with dirt may include other formulations whereby the constituents are present in the composition in the proportion of 60.9% to 71.8% dirt, 2.2% to 4.4% wood, 0.0% to 2.2% leaves, 8.9% to 17.4% manure, 8.6% to 10.2% sand, and 5.1% to 13.3% filtration waste. Weight fractions are relative to the total weight of the organic composition.

When the filtration waste is a waste byproduct of sugar refinement, the filtration waste is removed from filtering equipment after the refinement of sugar. The filtration waste is removed from filtration panels or elements via techniques understood in the manufacture and refinement of sugar.

When the filtration waste is not a waste byproduct of sugar refinement, the sugar, diatomaceous earth, and carbon may be separately purchased in powder or particulate form, placed in an industrial mixer, and blended with or without crushing until the constituents are evenly distributed throughout the mixture.

An organic composition is prepared by thoroughly mixing the constituents in a barrel mixer until the constituents are evenly distributed throughout the composition and free of agglomerations. For example, filtration waste with or without sand and optional soil(s) and/or compostable material(s) and/or non-compostable material(s) may be placed into a barrel mixer in the proper proportions and mixed until the constituents are evenly distributed throughout the mixture. Constituents may require drying or addition of water prior to and/or during mixing.

The organic composition is removed from the barrel mixer after mixing and then allowed to age as a separate and optional step. During aging, the compostable materials (if present) are decomposed naturally and by the organisms otherwise within the organic composition via the topsoil, dirt, wood chips, leaves, manure, grass, moss, worm castings, hay, straw, bark, cones, needles, nuts, and/or shells. The organic composition may require aeration during aging to allow for a more uniform decomposition and to avoid hot spots which could otherwise kill organisms within the colony. The aging step is dependent on the formulation, environmental conditions, and desired characteristics of the organic composition. In preferred embodiments, the organic composition is aged for at least six months. Decomposition is an ongoing process and may extend beyond the aging step so as to continue before and/or after purchase or use.

During and after the mixing and/or aging steps, the organism colony may feed on the sugar otherwise present via the filtration waste. It is believed that the sugar may provide a food source which promotes or otherwise accelerates reproduction of organisms within the organism colony. Growth of the organism colony may reduce the total time required to properly age the composition.

In accordance with the description provided herein, specific examples are described below for illustrative purposes only and not intended to otherwise limit the scope and meaning of the invention. Weights are provided in pounds (lbs.) and representative of sample size. Weights are also provided as a percent (%) of the total sample weight which includes the weight of each constituent. Formulations are scalable consistent with the identified weight fractions.

EXAMPLES 1-4

TABLES 1-4 describe organic exemplary compositions including topsoil, dirt, manure, wood chips, leaves, sand, and filtration waste.

TABLE 1

| Constituent | Weight (lbs.) | Approximate Weight (%) |
|---|---|---|
| Topsoil | 7.0 | 33.3 |
| Dirt | 7.0 | 33.3 |
| Manure | 2.0 | 9.5 |
| Wood chips | 0.5 | 2.4 |
| Leaves | 0.5 | 2.4 |
| Sand | 2.0 | 9.6 |
| Filtration waste | 2.0 | 9.5 |

TABLE 2

| Constituent | Weight (lbs.) | Approximate Weight (%) |
|---|---|---|
| Topsoil | 7.0 | 32.5 |
| Dirt | 7.0 | 32.5 |
| Manure | 1.0 | 4.7 |
| Wood chips | 1.0 | 4.7 |
| Leaves | 0.5 | 2.3 |
| Sand | 2.0 | 9.3 |
| Filtration waste | 3.0 | 14.0 |

TABLE 3

| Constituent | Weight (lbs.) | Approximate Weight (%) |
|---|---|---|
| Topsoil | 7.0 | 37.3 |
| Dirt | 7.0 | 37.3 |
| Manure | 1.0 | 5.3 |
| Wood chips | 0.5 | 2.7 |
| Leaves | 0.25 | 1.3 |
| Sand | 2.0 | 10.8 |
| Filtration waste | 1.0 | 5.3 |

TABLE 4

| Constituent | Weight (lbs.) | Approximate Weight (%) |
|---|---|---|
| Topsoil | 7.0 | 33.0 |
| Dirt | 7.0 | 33.0 |
| Manure | 1.5 | 7.1 |
| Wood chips | 0.5 | 2.4 |
| Leaves | 0.1875 | 0.9 |
| Sand | 2.0 | 9.4 |
| Filtration waste | 3.0 | 14.2 |

EXAMPLE 5

TABLE 5 describes an exemplary organic composition including topsoil, dirt, manure, wood chips, sand, and filtration waste.

TABLE 5

| Constituent | Weight (lbs.) | Approximate Weight (%) |
|---|---|---|
| Topsoil | 7.0 | 37.8 |
| Dirt | 7.0 | 37.8 |
| Manure | 1.0 | 5.4 |
| Wood chips | 0.5 | 2.7 |
| Leaves | 0.0 | 0.0 |
| Sand | 2.0 | 10.9 |
| Filtration waste | 1.0 | 5.4 |

EXAMPLES 6-9

TABLES 6-9 describe exemplary organic compositions including dirt, manure, wood chips, leaves, sand, and filtration waste.

TABLE 6

| Constituent | Weight (lbs.) | Approximate Weight (%) |
|---|---|---|
| Topsoil | 0.0 | 0.0 |
| Dirt | 14.0 | 60.9 |
| Manure | 4.0 | 17.4 |
| Wood chips | 0.5 | 2.2 |
| Leaves | 0.5 | 2.2 |
| Sand | 2.0 | 8.6 |
| Filtration waste | 2.0 | 8.7 |

TABLE 7

| Constituent | Weight (lbs.) | Approximate Weight (%) |
|---|---|---|
| Topsoil | 0.0 | 0.0 |
| Dirt | 14.0 | 62.2 |
| Manure | 2.0 | 8.9 |
| Wood chips | 1.0 | 4.4 |
| Leaves | 0.5 | 2.2 |
| Sand | 2.0 | 9.0 |
| Filtration waste | 3.0 | 13.3 |

TABLE 8

| Constituent | Weight (lbs.) | Approximate Weight (%) |
|---|---|---|
| Topsoil | 0.0 | 0.0 |
| Dirt | 14.0 | 70.9 |
| Manure | 2.0 | 10.1 |
| Wood chips | 0.5 | 2.5 |
| Leaves | 0.25 | 1.3 |
| Sand | 2.0 | 10.1 |
| Filtration waste | 1.0 | 5.1 |

TABLE 9

| Constituent | Weight (lbs.) | Approximate Weight (%) |
|---|---|---|
| Topsoil | 0.0 | 0.0 |
| Dirt | 14.0 | 61.7 |
| Manure | 3.0 | 13.2 |
| Wood chips | 0.5 | 2.2 |
| Leaves | 0.1875 | 0.8 |
| Sand | 2.0 | 8.9 |
| Filtration waste | 3.0 | 13.2 |

TABLE 10 describes an exemplary organic composition including topsoil, dirt, manure, wood chips, sand, and filtration waste.

TABLE 10

| Constituent | Weight (lbs.) | Approximate Weight (%) |
|---|---|---|
| Topsoil | 0.0 | 0.0 |
| Dirt | 14.0 | 71.8 |
| Manure | 2.0 | 10.3 |
| Wood chips | 0.5 | 2.6 |
| Leaves | 0.0 | 0.0 |
| Sand | 2.0 | 10.2 |
| Filtration waste | 1.0 | 5.1 |

EXAMPLE 11

TABLE 11 describes exemplary organic composition including wood chips, leaves, and filtration waste.

TABLE 11

| Constituent | Weight (lbs.) | Approximate Weight (%) |
|---|---|---|
| Topsoil | 0.0 | 0.0 |
| Dirt | 0.0 | 0.0 |
| Manure | 0.0 | 0.0 |
| Wood chips | 1.0 | 19.5 |
| Leaves | 0.125 | 2.5 |
| Sand | 0.0 | 0.0 |
| Filtration waste | 4.0 | 78.0 |

As is evident from the explanation herein, the invention is a composition which promotes plant growth and quality. Accordingly, the described invention is expected to be applicable as a medium for supporting plant growth, or as an amendment, additive, or supplement for use with soil to promote or enhance plant growth.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. An organic composition for use with plants comprising:
   topsoil in the range from 0.0% to 37.8% by weight relative to total weight of said organic composition;
   dirt in the range from 0.0% to 71.8% by weight relative to total weight of said organic composition;
   wood chips in the range from 2.2% to 19.5% by weight relative to total weight of said organic composition;
   leaves in the range from 0.0% to 2.4% by weight relative to total weight of said organic composition;

manure in the range from 0.0% to 17.4% by weight relative to total weight of said organic composition;
sand in the range from 0.1% to 10.9% by weight relative to total weight of said organic composition; and
a filtration waste which includes carbon, diatomaceous earth, and sugar, said filtration waste in the range from 5.1% to 78.0% by weight relative to total weight of said organic composition.

2. An organic composition for use with plants comprising:
dirt in the range from 60.9% to 71.8% by weight relative to total weight of said organic composition;
wood chips in the range from 2.2% to 4.4% by weight relative to total weight of said organic composition;
leaves in the range from 0.0% to 2.2% by weight relative to total weight of said organic composition;
manure in the range from 8.9% to 17.4% by weight relative to total weight of said organic composition;
sand in the range from 8.6% to 10.2% by weight relative to total weight of said organic composition; and
a filtration waste which includes carbon, diatomaceous earth, and sugar, said filtration waste in the range from 5.1% to 13.3% by weight relative to total weight of said organic composition.

3. An organic composition for use with plants comprising:
sand; and
a filtration waste which includes carbon, diatomaceous earth, and sugar.

4. An organic composition for use with plants comprising:
soil;
sand; and
a filtration waste which includes carbon, diatomaceous earth, and sugar.

5. The organic composition of claim 4, wherein said soil is topsoil.

6. The organic composition of claim 4, wherein said soil is dirt.

7. An organic composition for use with plants comprising:
a compostable material;
sand; and
a filtration waste which includes carbon, diatomaceous earth, and sugar.

8. The organic composition of claim 7, wherein said compostable material is wood chips.

9. The organic composition of claim 7, wherein said compostable material is leaves.

10. The organic composition of claim 7, wherein said compostable material is manure.

11. The organic composition of claim 7, wherein said compostable material is grass.

12. The organic composition of claim 7, wherein said compostable material is moss.

13. The organic composition of claim 7, wherein said compostable material is worm castings.

14. The organic composition of claim 7, wherein said compostable material is hay.

15. The organic composition of claim 7, wherein said compostable material is straw.

16. The organic composition of claim 7, wherein said compostable material is bark.

17. The organic composition of claim 7, wherein said compostable material is a cone.

18. The organic composition of claim 7, wherein said compostable material is a needle.

19. The organic composition of claim 7, wherein said compostable material is a nut.

20. The organic composition of claim 7, wherein said compostable material is a shell.

21. The organic composition of claim 7, wherein said compostable material is paper.

22. The organic composition of claim 7, wherein said compostable material is cardboard.

23. A method of producing an organic composition for use with plants comprising the steps of:
(a) removing a filtration waste from filtering equipment after refinement of sugar, said filtration waste being a waste byproduct of sugar refinement, said filtration waste including carbon, diatomaceous earth, and sugar; and
(b) mixing said filtration waste and a non-compostable material.

24. The method of claim 23, wherein said non-compostable material is sand.

25. The method of claim 23, wherein said non-compostable material is a crushed seashell.

26. A method of producing an organic composition for use with plants comprising the steps of:
(a) removing a filtration waste from filtering equipment after refinement of sugar, said filtration waste being a waste byproduct of sugar refinement, said filtration waste including carbon, diatomaceous earth, and sugar; and
(b) mixing said filtration waste and soil.

27. The method of claim 26, wherein said soil is topsoil.

28. The method of claim 26, wherein said soil is dirt.

29. A method of producing an organic composition for use with plants comprising the steps of:
(a) removing a filtration waste from filtering equipment after refinement of sugar, said filtration waste being a waste byproduct of sugar refinement, said filtration waste including carbon, diatomaceous earth, and sugar; and
(b) mixing said filtration waste and a compostable material.

30. The method of claim 29, wherein said compostable material is wood chips.

31. The method of claim 29, wherein said compostable material is leaves.

32. The method of claim 29, wherein said compostable material is manure.

33. The method of claim 29, wherein said compostable material is grass.

34. The method of claim 29, wherein said compostable material is moss.

35. The method of claim 29, wherein said compostable material is worm castings.

36. The method of claim 29, wherein said compostable material is hay.

37. The method of claim 29, wherein said compostable material is straw.

38. The method of claim 29, wherein said compostable material is bark.

39. The method of claim 29, wherein said compostable material is a cone.

40. The method of claim 29, wherein said compostable material is a needle.

41. The method of claim 29, wherein said compostable material is a nut.

42. The method of claim 29, wherein said compostable material is a shell.

43. The method of claim 29, wherein said compostable material is paper.

44. The method of claim 29, wherein said compostable material is cardboard.

* * * * *